United States Patent
Cannings

(10) Patent No.: US 10,546,064 B2
(45) Date of Patent: Jan. 28, 2020

(54) SYSTEM AND METHOD FOR CONTEXTUALISING A STREAM OF UNSTRUCTURED TEXT REPRESENTATIVE OF SPOKEN WORD

(71) Applicants: Nigel Henry Cannings, London (GB); INTELLIGENT VOICE LIMITED, London (GB)

(72) Inventor: Nigel Henry Cannings, London (GB)

(*) Notice: Subject to any disclaimer, the term of this patent is extended or adjusted under 35 U.S.C. 154(b) by 102 days.

(21) Appl. No.: 15/116,187

(22) PCT Filed: Feb. 4, 2015

(86) PCT No.: PCT/GB2015/050303
§ 371 (c)(1),
(2) Date: Aug. 2, 2016

(87) PCT Pub. No.: WO2015/118324
PCT Pub. Date: Aug. 13, 2015

(65) Prior Publication Data
US 2017/0011024 A1    Jan. 12, 2017

(30) Foreign Application Priority Data

Feb. 4, 2014 (GB) .................................. 1401868.3
Feb. 4, 2014 (GB) .................................. 1401869.1

(51) Int. Cl.
| | |
|---|---|
| G10L 15/26 | (2006.01) |
| G06F 17/27 | (2006.01) |
| G06F 16/683 | (2019.01) |
| G10L 15/18 | (2013.01) |

(52) U.S. Cl.
CPC .......... *G06F 17/278* (2013.01); *G06F 16/685* (2019.01); *G06F 17/271* (2013.01); *G06F 17/2785* (2013.01); *G10L 15/1822* (2013.01); *G10L 15/26* (2013.01)

(58) Field of Classification Search
CPC ............................. G10L 15/1822; G10L 15/26
See application file for complete search history.

(56) References Cited

U.S. PATENT DOCUMENTS

| | | | |
|---|---|---|---|
| 6,622,140 B1* | 9/2003 | Kantrowitz | G06K 9/62 |
| 2002/0010587 A1* | 1/2002 | Pertrushin | G10L 17/26 704/275 |
| 2004/0161091 A1* | 8/2004 | Fan | H04M 3/493 379/207.12 |
| 2014/0136197 A1* | 5/2014 | Mamou | G10L 15/08 704/235 |

FOREIGN PATENT DOCUMENTS

CN        103678278    * 12/2013

* cited by examiner

*Primary Examiner* — Feng-Tzer Tzeng

(57) ABSTRACT

A system for contextualising an unstructured stream of text, representative of spoken word, including a grammar processor, a sentence processor, a frequency processor, a summer and an emotion processor. The unstructured stream of text is processed and outputs an audio file total for each matched phrase, word and proper noun, determined from the unstructured text, to a data significance processor. The data significance processor receives and audio file total for each name, proper noun and matched real phrase, determined from the unstructured text, and outputs a list including the names, proper nouns and matched real phrases in order of contextual significance.

23 Claims, 6 Drawing Sheets

Transcript Index

<00:00:00:00>phrase1<00:00:04:50>
<00:00:04:50>phrase2<00:00:12:30>
<00:00:12:50>phrase3<00:00:19:00>
  ...
<00:15:01:00>the princess kissed the frog<00:15:05:00>
<00:15:05:00>phrase106<00:15:12:40>
<00:15:12:00>phrase107<00:15:32:40>
  ...

Fig. 2

Enhanced Transcript Index

<00:00:00:00>phrase1<00:00:04:50>
<00:00:04:50>phrase2<00:00:12:30>
<00:00:12:50>phrase3<00:00:19:00>
  ...
<00:15:01:00>the princess kissed the frog<00:15:05:00>
<00:15:02:66>kissed the frog<00:15:05:00>
<00:15:04:33>frog<00:15:05:00>
<00:15:05:00>phrase106<00:15:12:40>
<00:15:12:00>phrase107<00:15:32:40>

Fig. 3

Enhanced Combined Index

'And'
audiofile#1<00:00:00:50>
audiofile#1<00:00:02:00>
...
audiofile#2<00:00:02:00>
...
audiofile#n<hh:mm:ss:xx>

'Andrew'
audiofile#1<00:00:05:00>
audiofile#6<00:01:22:00>
...
'Fraud'
audiofile#1<00:00:08:00>
audiofile#6<00:01:33:00>
...

Fig. 8

Enhanced Combined Index

Stressed Words:
'Andrew'
audiofile#1<00:00:05:00>
'Fraud'
audiofile#1<00:00:08:00> ...
All Words:
'And'
audiofile#1<00:00:00:50>
audiofile#1<00:00:02:00>
... audiofile#2<00:00:02:00>
... audiofile#n<hh:mm:ss:xx> ...
'Andrew'
audiofile#1<00:00:05:00>
audiofile#6<00:01:22:00>
...
'Fraud'

Fig. 9

```
Enhanced Combined Index (Ranked by popularity from
predetermined list of interest)

'Default' (108 instances)
audiofile#1<00:01:03:50>
audiofile#1<00:02:26:50>
audiofile#4<00:04:12:00>
...
'Insolvent' (78 instances)
audiofile#1<00:01:03:50>
audiofile#1<00:02:26:50>
audiofile#4<00:04:12:00>
...
'Fraud' (23 instances)
audiofile#1<00:00:08:00>
audiofile#6<00:01:33:00>
...
'Illegal' (6 instances)
audiofile#  <00:01:18:00>
```

Fig. 10

```
ist of interest

'Default'
'Fraud'
'FSA'
'Insolvent'
'Illegal'
...
```

Fig. 11

SYSTEM AND METHOD FOR CONTEXTUALISING A STREAM OF UNSTRUCTURED TEXT REPRESENTATIVE OF SPOKEN WORD

RELATED APPLICATIONS

This application is a National Stage Application filed under 35 U.S.C. 371 of the International Application having Serial No. PCT/GB2015/050303, filed 4 Feb. 2015, which claims priority to a GB Application having Serial No. 1401869.1, filed 4 Feb. 2014, and a GB Application having Serial No. 1401868.3, filed 4 Feb. 2014, wherein the aforementioned three applications ('303, '869.1 and '868.3) are incorporated by reference herein.

FIELD OF INVENTION

This invention relates to a system and method for indexing and contextualising unstructured text representative of spoken word, particularly unstructured text representative of the spoken word of telephone calls, and more particularly for contextualising unstructured text for monitoring the spoken word, including telephone calls.

BACKGROUND

A normal audio or video file is in effect a serial access medium whereby in order to access certain audio (including speech) contained within it, it is necessary to listen to or to watch the file at its original speed (or very close to it) until that data is found. Thus, for someone tasked with listening to an audio file or watching a video file to search for certain words or phrases (e.g. a paralegal in a discovery process), such a task is time consuming and fatiguing. In contrast, for example, a paper transcript can be quickly skim read by a human at rates at a rate in excess of 700 words per minute, i.e. in a fraction of the time and the effort.

A human transcription of audio, whilst generally accurate, is time consuming, often taking 6 to 8 hours to transcribe one audio hour. Furthermore, whilst machine transcription of audio does exist, it is not perfect and even if it were, it is often difficult to make full sense of a machine transcription if the audio is not played at the same time to give context to the transcription.

It is known for lengthy machine or human transcripts to be provided with time stamps interspersed therein. For example, indicating when a conversation, part of a conversation or a paragraph begins and its duration.

It is also known from European Patent Application EP0649144A1 to analyse audio in order to aligning a written transcript with speech in video and audio clips; in effect, providing an index for random access to corresponding words and phrases in the video and audio clips.

Automated Speech Recognisers (ASR) receive audio information signal representative of spoken word and output a transcript of the recognised speech. However, the transcripts are grammatically unstructured and therefore it is not possible to gain any contextual understanding or derive other potentially important information of the spoken word from the transcript.

Moreover, determining and monitoring the context of the spoken word in, for example, telephone conversations is particularly problematic for automated systems because telephone conversations are more chopped and broken compared to the spoken word in, for example, presentations, dictations and face to face conversations. Also, when monitoring telephone conversations for unlawful or adverse practices, parties of the telephone conversation may use coded words or covert behaviour.

Whilst automated speech recognisers attempt to screen out variations in the pronunciation of a word so as to arrive at the same recognised word irrespective of the speaker and the mood or emphasis of the speaker downstream added value analysis of recognised speech benefits from the presence of such variations, such as in the recognition of emotional intensity. Is therefore desirable to provide a method and system which preserves audio information beyond an automated speech recognition phase of analysis.

It is therefore desirable in a number of industries for there to be a system and method for indexing and determining and monitoring the context of unstructured text representative of spoken word.

It is also desirable to optimise the transducing of sound energy, such as an audio information signal representative of the spoken word, into a digitised signal so as to optimise the use of a system and method of indexing recognised speech after automated speech recognition.

SUMMARY OF THE INVENTION

According to a first aspect of the present invention, there is provided a system for contextualising an unstructured stream of text representative of spoken word, the system comprising: a grammar processor operable to receive an indexed and time-recorded unstructured stream text, and identify and extract sentences, names and proper nouns from the unstructured stream of text and output a sentence list, a names list and a proper nouns list; a sentence processor comprising a natural language processor, a real phrase database and a phrase comparator, wherein the natural language processor is operable to receive the sentence list from the grammar processor and segment each sentence into possible phrases, and the phrase comparator is operable to receive the possible phrases and compare each possible phrase with a plurality of real phrases stored in the real phrase database to provide a matched phrase list derived from the possible phrases; a frequency processor operable to receive the word list, proper noun list and matched phrase list and determine the number of occurrences of each word, proper noun and matched phrase in the unstructured stream of text, in a system word and phrase corpus and in a real-world word and phrase database and for each name, proper noun and matched phrase, provide a text frequency total, a system corpus total and a real world total; a summer operable to sum the text frequency total, the system corpus total and real world total for each name, proper noun and matched real phrase and output the sum as an audio file total for each name, proper noun and matched real phrase; an emotion processor operable to receive the sentence list, evaluate the sentiment of the spoken word and provide a sentiment score, wherein the sentiment is evaluated by determining at least one of accentuation of the words and phrases, word and phrase pattern, positive-negative word and phrase recognition, rate of phrases over time and rate of syllables over time, of each sentence; and a data significance processor operable to receive the audio file total for each name, proper noun and matched real phrase and output a list comprising the names, proper nouns and matched real phrases in order of contextual significance.

Advantageously, the lower the audio file total of the name, proper noun or matched real phrase, the more contextually significant it is determined to be relative to the other names, proper nouns and matched real phrases of the unstructured stream of text representing the spoken word.

Advantageously, the lower the system corpus number the more contextually significant the name, proper noun or matched real phrase is determined to be relative to the other names, proper nouns and matched real phrases of the unstructured stream of text representing the spoken word.

The system may further comprise an automatic speech recogniser operable to receive audio information signals representing spoken word and convert the audio information signals into said unstructured stream of text for input into the grammar processor. The automatic speech recogniser is advantageously operable to index and time-record each word of the unstructured stream of text.

Additionally or alternatively, the automatic speech recogniser is advantageously operable to index and time-record each syllable of the unstructured stream of text.

A weighting is advantageously applicable to at least one of the system corpus total and the matched phrase total. The weighting is advantageously an industry weighting, dependent on the industry in which the system is being used.

A weighting is advantageously applicable to the sentiment score. The weighting is advantageously a sentiment industry weighting, dependent on the industry in which the system is being used.

The audio file total for each name, proper noun and matched real phrase is advantageously indexed and accorded at least one of the date on which the spoken word occurred, a start time, a finish time and a duration.

The data significance processor is advantageously operable to determine the contextual significance between selected or predetermined dates.

The unstructured stream of text may be representative of the spoken word of a telephone conversation. The unstructured stream of text may be received as a real-time data stream.

The system may preferably comprise an acoustic-to-electric transducer operable to sense the spoken word in the frequency range of 20 Hz to 20 kHz and convert the sensed spoken word into an electrical signal. Sensing over this range, a range beyond which the normal adult hearer will be able to detect the sound provides additional information for use in emotion analysis not available to the human listener. The above range may be more preferably 300 Hz to 20 kHz. The screening out low-frequency noises such as occasion by 'electrical hum' at 50 or 60 Hz and the operation of heavy equipment which may unnecessarily bias sound intensity versus comparisons of the human voice.

The system may further comprise a signal processor operable to filter the electrical signal to a frequency range of 300 Hz to 3400 Hz. This is preferable since when used in conjunction with the frequency range of the above transducer means that background noise is best reduced whilst making use of harmonics of the higher frequencies detected which will contribute in the lower frequency range whilst isolating frequencies most useful in analysing the human voice.

Hence, the system (and also the related method) may preferably provide two data streams, one with a 20 Hz to 20 kHz frequency range for use downstream of an automated speech recognition function and preferably for use in an emotion processor whilst a second data stream derived from the first provides information in the frequency range of 300 Hz to 3400 Hz for use in the automated speech recognition function. This combination of frequency ranges enables optimised broad range speech recognition of words across a plurality of users whilst preserving additional information, for use in the context of a given word, to derive enhanced emotion information. By example, recognition in the frequency range 300 Hz to 3400 Hz of the word 'help' can give optimal recognition across persons of a range of ages and genders. However, by retaining frequency information in the range 3400 Hz to 20 kHz, information not readily isolated by the human listener or even detectable by the human listener, the emotion processor can evaluate whether the word 'help' is indicative of a stressful situation requiring emergency help or whether the word, may, for example, be an offer of help by the speaker to the listener. Differentiating between these two situations first requires recognition of the underlying word in an accurate efficient manner (i.e. knowing that the word actually is 'help' rather than, say 'yelp', best achieved by the filtered signal range of 300 Hz to 3400 Hz whilst, have established that the word actually is 'help' the emotion processor utilises the sound intensity relative to the intensity in the rest of the range to establish if it is an urgent call for help or otherwise, such as an offer of help.

According to a second aspect of the present invention there is provided a method for contextualising an unstructured stream of text representative of spoken word, the method comprising: providing a grammar processor; inputting an indexed and time-recorded unstructured stream text into the grammar processor and identifying and extracting sentences, names and proper nouns from the unstructured stream of text and outputting a sentence list, a names list and a proper nouns list; providing a sentence processor comprising a natural language processor, a real phrase database and a phrase comparator; inputting the sentence list into the natural language processor and segmenting each sentence into possible phrases; inputting the possible phrases into a comparator and comparing each possible phrase with a plurality of real phrases stored in the real phrase database and outputting a matched phrase list derived from the possible phrases; providing a frequency processor; inputting the word list, proper noun list and matched phrase list into the frequency processor; determining the number of occurrences of each word, proper noun and matched phrase in the unstructured stream of text, in a system word and phrase corpus and in a real-world word and phrase database; and outputting a text frequency total, a system corpus total and a real world total for each name, proper noun and matched phrase; providing a summer; inputting and summing the text frequency total, the system corpus total and real world total for each name, proper noun and matched real phrase; and outputting each sum as an audio file total for each name, proper noun and matched real phrase; providing an emotion processor; inputting the sentence list into the emotion processor and evaluating the sentiment of the spoken word based on at least one of accentuation of the words and phrases, word and phrase pattern, positive-negative word and phrase recognition, rate of words over time, rate of phrases over time and rate of syllables over time in the unstructured stream of text; and outputting a sentiment score derived from evaluating the sentiment of the spoken word; and providing a data significance processor; inputting the audio file total for each name, proper noun and matched real phrase into the data significance processor; and outputting a list comprising the names, proper nouns and matched real phrases in order of contextual significance.

In particular, the emotion processor may analyse the sound intensity of an identified word or phrase in the 3400 Hz to 20 kHz range and compare this to the sound intensity over the whole of the detected range, such as 20 Hz to 20 kHz and use this to assign an emotion score for that word. If the emotion score, because of a higher sound intensity in the high frequency range such as compared to a reference annunciation of the word is above a threshold value then the system or method may result in a message sent externally for the purposes of alerting a response team or unit, or even sending a response team or unit of personnel to undertake a given action, such as preparing for or undertaking an emergency response. This has the advantage that the system or method of the present invention can supplement or override a human listener, such as an emergency systems receptionist, by deriving information not available to that human listener, such as by means of the emotion processor, and is illustrated in the example previously mentioned regarding the word 'help'.

Advantageously, the lower the audio file total of the name, proper noun or matched real phrase, the more contextually significant it is determined to be relative to the other names, proper nouns and matched real phrases of the unstructured stream of text representing the spoken word.

Advantageously, the lower the system corpus number the more contextually significant the name, proper noun or matched real phrase is determined to be relative to the other names, proper nouns and matched real phrases of the unstructured stream of text representing the spoken word.

The method further comprises providing an automatic speech recogniser, inputting audio information signals representing spoken word into the automatic speech recogniser and converting the audio information signals into said unstructured stream of text for input into the grammar processor.

The automatic speech recogniser advantageously indexes and time-records each word of the unstructured stream of text.

Additionally, or alternatively, the automatic speech recogniser advantageously indexes and time-records each syllable of the unstructured stream of text.

A weighting is advantageously applied to at least one of the system corpus total and the matched phrase total. The weighting is advantageously an industry weighting, dependent on the industry in which the system is being used.

A weighting is advantageously applied to the sentiment score. The weighting is advantageously a sentiment industry weighting, dependent on the industry in which the system is being used.

The audio file total for each name, proper noun and matched real phrase is advantageously indexed and accorded at least one of the date on which the spoken word occurred, a start time, a finish time and a duration.

The data significance processor advantageously determines the contextual significance between selected or predetermined dates.

The unstructured stream of text may be representative of the spoken word of a telephone conversation.

The unstructured stream of text may be received as a real-time data stream. Alternatively, the unstructured stream of text may be received as a recorded audio file.

The method may further comprise providing an acoustic-to-electric transducer and sensing the spoken word in the frequency range of 20 Hz to 20 kHz and converting the sensed spoken word into an electrical signal.

The method may further comprise providing a signal processor and processing the electrical signal to a frequency range of 300 Hz to 3400 Hz According to a third aspect of the present invention there is provided a computer program product comprising a computer readable medium having a computer readable program stored thereon, wherein the computer readable program when executed on a computer causes the computer to carry out a method according to the second aspect of the present invention.

The system and method may include indexing an audio file comprising the steps of providing information identifying a phrase or passage of spoken word or content in the audio file together with corresponding timing information relating to when that phrase or passage occurs in the audio file and, from that information, generating a file containing an index entry of when a component of the phrase or passage occurs in the audio file. The file may be a modified version of the audio file generated by appending generated by appending the index entry to the audio file.

Ideally, creating an index entry of when a component of the phrase or passage occurs in the audio file comprises interpolating using the timing information together with the nature of the component relative to the nature of the phrase or passage. For example, interpolation may be based on the number of letters, syllables or words in the component relative to the number of letters, syllables or words in the phrase or passage respectively.

The inventor has realised that it is possible to supplement the part indexing of phrases and passages in an audio file with index entries relating to components of those phrases or passages, all without requiring further analysis of the audio stream.

BRIEF DESCRIPTION OF THE DRAWINGS

The present invention will now be illustrated, by way of example only, with reference to the accompanying drawing in which:

FIGS. 2 and 3 respectively illustrate a transcript index and an enhanced transcript index to which a method according to the present invention has been applied.

FIGS. 7, 8 and 9 illustrate embodiments of combined indexes, generated in accordance with the present invention; and FIGS. 10 and 11 illustrate an embodiment of a combined index generated from in accordance with the present invention from a predetermined list of words of interest.

DETAILED DESCRIPTION

Figure 1:
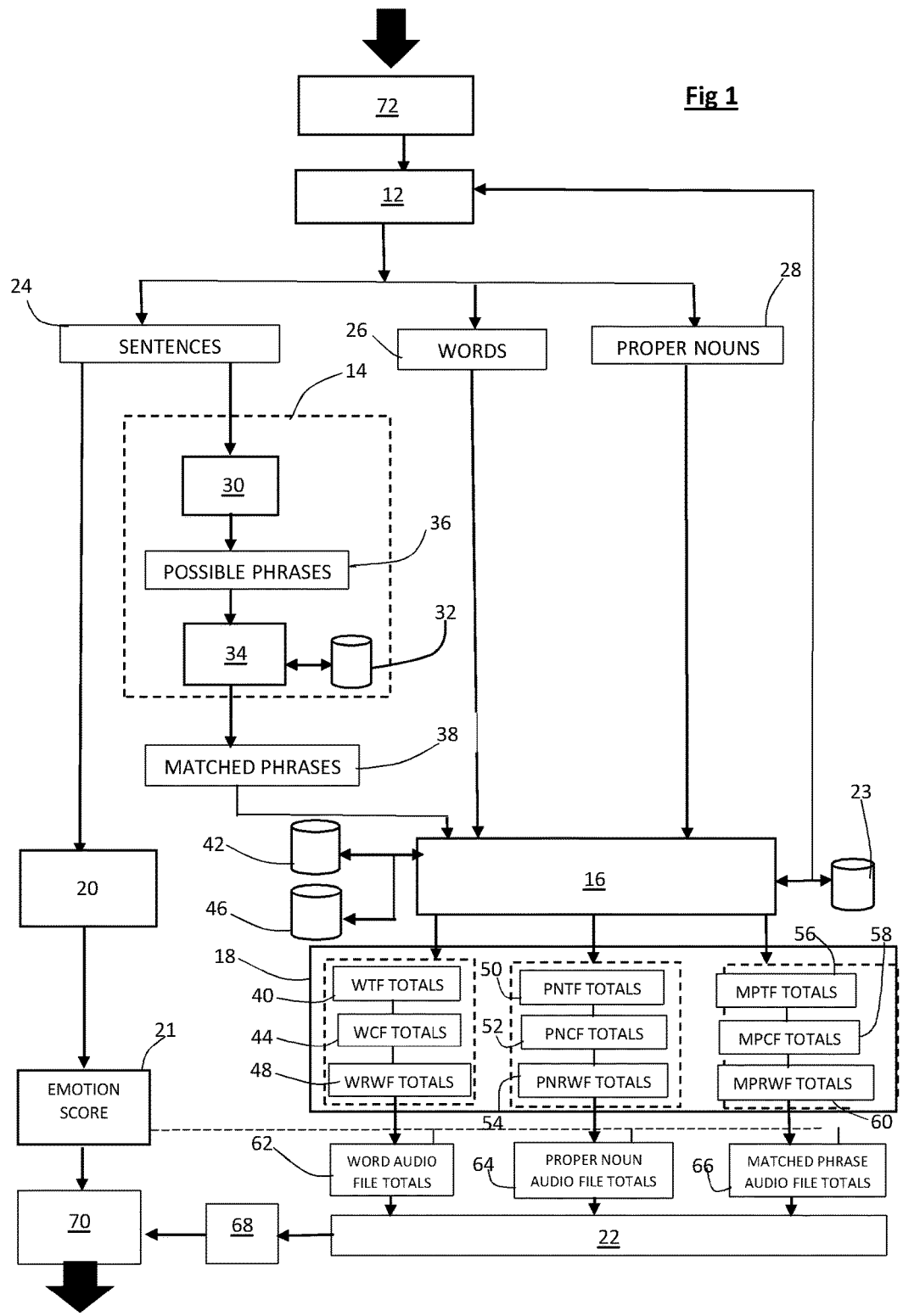
FIG. 1 is a schematic drawing of a system and method according to the present invention.

Referring to FIG. 1, a system 10 for contextualising an unstructured stream of text representative of spoken word, according to the present invention, comprises a grammar processor 12, a sentence processor 14 a frequency processor 16, a summer 18, an emotion processor 20 and a data significance processor 22.

The system 10 enables a user to discern the context of an unstructured stream of text. Within the meaning of the present application, an unstructured stream of text is a stream or string of characters having no grammar (e.g. spaces, full stops, comers, capital letters, etc.) and therefore the context of the text is indiscernible to human perception.

For example, if we consider the simple spoken word sentence:

"I'd like to be put through to Andrew Burns, Finance Director. Hold the line, I'll see if he's in."

The unstructured stream of text may be:

" . . . idliketobeputtrhroughtoandrewburnsfinancedireto- rholdthelineillseeifhesin . . . ."

Furthermore, the system 10 enables a user to monitor conversations (e.g. telephone calls) for unlawful or adverse behaviour by discerning patterns of human behaviour in spoken word, in the unstructured stream of text, which is indiscernible to human perception. Moreover, the system 10 enables a user to discern and monitoring the context of the spoken word in telephone conversations is particularly problematic for automated systems because telephone conversations are more chopped and broken compared to the spoken word in presentations, dictations and the like and even face to face conversations.

The grammar processor 12 receives an unstructured stream of text and stores it on a text server 23, identifies sentences, words and proper nouns in the unstructured stream of text, extracts the identified sentences, words and proper nouns from the unstructured text, and outputs a sentence list 24, a words list 26, and a proper nouns list 28, each including the extracted sentences, words and proper nouns, respectively.

The sentence processor 14 comprises a natural language processor 30, a real phrase database 32 and a phrase comparator 34. The sentence processor 14 is operable to identify real phrases in the unstructured stream of text, which are indiscernible to human perception and known natural language processors.

Returning to the example unstructured stream of text:
"idliketobeputthroughtoandrewburnsfinancedirectorhold-thelineillseeifhesin . . . ."

If we consider the word "burns". It can be a verb, a noun or a proper noun. In the spoken word sentence the word "burns" is used as a proper noun, being the surname of Andrew. However, in an unstructured stream of text, known natural language processors would have difficulty determining whether the word "burns" was being used as a verb, noun or proper noun. Consequently, the context of the spoken word is indiscernible from the unstructured stream of text to known natural language processors.

Similarly, for example, for the spoken words " . . . Director. Hold . . . ", the unstructured stream of text reads " . . . directorhold . . . " which can be interpreted correctly as " . . . Director. Hold . . . " or incorrectly as " . . . direct or hold . . . ". The present invention overcomes these shortcomings.

The natural language processor 30 receives the sentence list 24 from the grammar processor 12, segments each sentence into all possible phrases and outputs a list of all possible phrases. In the present application, all possible phrases means all phrases which are possible linguistically or not. That is to say, the natural language processor 30 outputs a list of all possible phrases whether the phrases make sense or exist in the language or not.

The phrase comparator 34 receives the list of the possible phrases and compares each possible phrase with a plurality of real phrases stored on the real phrase database 32. The phrase comparator 34 outputs a matched phrase list. A matched phrase is a possible phrase which the comparator has matched with a real phrase stored on the real phrase database 26.

The frequency processor 16 receives the word list 26, extracts each word from the word list 26, compares each extracted word with the unstructured stream of text stored on the text server 23, determines the number of occurrences of the extracted word in the unstructured stream of text, and outputs a word text frequency (WTF) total 40 for each extracted word, indicative the number of occurrences.

The frequency processor 16 also compares each extracted word with a system corpus 42, determines the number of occurrences of the extracted word in the system corpus, and outputs a word corpus frequency (WCF) total 44 indicative the number of occurrences.

The frequency processor 16 also compares each extracted word with words stored on a real-world word and phrase database 46, determines the number of occurrences of the extracted word on the real-world word and phrase database 46, and outputs a word real-world frequency (WRWF) total 48 for each extracted word indicative of the number of occurrences.

Similarly, the frequency processor 16 receives the proper noun list 28, extracts each proper noun from the proper noun list 28, compares each extracted proper noun with the unstructured stream of text stored on the text server 23, determines the number of occurrences of the extracted proper noun in the unstructured stream of text, and outputs a proper noun text frequency (PNTF) total 50 for each matched phrase, indicative of the number of occurrences.

The frequency processor 16 also compares each extracted proper noun with the system corpus 42, determines the number of occurrences of the extracted proper noun in the system corpus 42, and outputs a proper noun corpus frequency (PNCF) total 52 indicative of the number of occurrences.

The frequency processor 16 also compares each extracted proper noun with words stored on the real-world word and phrase database 46, determines the number of occurrences of the extracted proper noun on the real-world word and phrase database 46, and outputs a proper noun real-world frequency (PNRWF) 54 total for each extracted proper noun, indicative of the number of occurrences.

Similarly, the frequency processor 16 receives the matched phrase list 38, extracts each matched phrase from the matched phrase list 38, compares each extracted matched phrase with the unstructured stream of text stored on the text server 23, determines the number of occurrences of the extracted matched phrase in the unstructured stream of text, and outputs a matched phrase text frequency (MPTF) total 56 for each matched phrase, indicative of the number of occurrences.

The frequency processor 16 also compares each extracted matched phrase with the system corpus 42, determines the number of occurrences of the extracted matched phrase in the system corpus 42, and outputs a matched phrase corpus frequency (MPCF) 58 total indicative of the number of occurrences.

The frequency processor 16 also compares each extracted matched phrase with phrases stored on the real-world word and phrase database 46, determines the number of occurrences of the extracted matched phrase on the real-world word and phrase database 46, and outputs a matched phrase real-world frequency (MPRWF) total 60 for each matched phrase, indicative of the number of occurrences.

The system corpus 42 is an application-specific corpus of words and phrases developed by the system through processing streams of text in the specific relevant application. For example, the corpus may be industry relevant, such as, for example, recruitment, wherein the corpus of words and phrases relevant to the recruitment industry is built as streams of recruitment relevant text is processed.

The real-world word and phrase database 46 is a database of words and phrases extracted from common everyday books, publications and the internet in the relevant language. Sources may, for example, include The Oxford Dictionary and other dictionaries, newspapers and magazines and commonly used internet websites such as Wikipedia.

The real-world word and phrase database 46 therefore acts as a normalising function for the system corpus 42.

For each extracted word, the summer 18 receives the word text frequency total 40, the word corpus frequency total 44 and the word real-world frequency total 48, and sums the word text frequency total, the word corpus frequency total and the word real-world frequency total to provide a word audio file total 62 for each extracted word.

For each extracted proper noun, the summer 18 receives the proper noun text frequency total 50, the proper noun corpus frequency total 52 and the proper noun real-world frequency total 54, and sums the proper noun text frequency total 50, the proper noun corpus frequency total 52 and the proper noun real-world frequency total 54 to provide a proper noun audio file total 64 for each extracted proper noun.

For each extracted matched phrase, the summer 18 receives the matched phrase text frequency total 56, the matched phrase corpus frequency total 58 and the matched phrase real-world frequency total 60, and sums the matched phrase text frequency total 56, the matched phrase corpus frequency total 58 and the matched phrase real-world frequency total 60 to provide an proper noun audio file total 66 for each extracted matched phrase.

The summer 18 outputs the word audio file total 62 for each extracted word, the proper noun audio file 64 for each extracted proper noun and the matched phrase audio file total 66 for each matched phrase.

The emotion processor 20 receives the sentence list 24 from the grammar processor 12 and extracts the sentences from the sentence list 24. The emotion processor 20 evaluates the sentiment of the spoken word by determining one or more of the following characteristics for each extracted sentence: the accentuation of the words and sentences; word and phrase pattern; positive-negative word and phrase recognition; rate of words over time; rate of phrases over time and the rate of syllables over time. The sentiment evaluation is improved when more than one of the aforementioned characteristics. The emotion processor 20 outputs an emotion score 21 derived from the evaluation of the one or more characteristics.

In one embodiment the emotion score 21 can be applied as a positive or negative value to each of the word audio file totals 62 for each of the relevant extracted words, the proper noun audio file totals 64 for each of the relevant extracted proper nouns, and each of the matched phrase audio file total 66 for each of the relevant matched phrases. Alternatively, the emotion score 21 for each word audio file total 62, each proper noun audio file total 64, and each matched phrase audio file total 66 can be considered independently.

In another embodiment, a weighting can be applied to any one or more of each word audio file total 62, each proper noun audio file total 64, each matched phrase audio file total 66 and each emotion score 21. The weighting can be an application-specific weighting such as an industry weighting whereby the accuracy of the system continually improves as more industry-specific unstructured text is processed.

The data significance processor 22 receives the word audio file total 62 for each word, the proper noun audio file total for each proper noun and matched phrase audio file total for each matched phrase and compiles a significance list 68 of the names, proper nouns and matched phrases in order of contextual significance. The contextual significance is determined by the value of the audio file totals for the words, proper nouns and matched phrases and, if applied, the applied emotion score and/or weighting.

The lower the audio file total (62, 64, 66) of the word, proper noun or matched phrase, the more significant the word, proper noun or matched phrase is determined to be in the spoken word being processed. Additionally, or alternatively, the lower the system corpus total (44, 52, 58) of the word, proper noun or matched phrase, the more significant the word, proper noun or matched phrase is considered to be in the spoken word being processed.

The significance list 68 of the names, proper nouns and matched phrases is inputted into a User Interface (UI) 70 which processes the significance list 68 to provide a dashboard-type visual display, visually indicative of the most significant words, proper nouns and phrases. The UI may process the significance list to display the most significant words, proper nouns and phrases between selected or preselected indexed dates and times of the spoken word such that, for example, a telephone conversation or a plurality of telephone conversations can be monitored and recalled over a desired period of time.

The system 10 may also comprise an automatic speech recogniser 72, which receives audio information signals representing spoken word and converts the audio information signals into the unstructured stream of text for processing by the grammar processor 12.

The automatic speech recogniser 72 also indexes and time records each spoken word and/or syllable. Alternatively, the spoken word may be indexed and time-recorded using an independent indexer (not shown), which is part of the system but not part of the automatic speech recogniser 72. The system may further comprise an acoustic-to-electric transducer (not shown), such as a microphone, which is operable to sense the spoken word in the frequency range of 20 Hz to 20 kHz and convert the sensed spoken word into an electrical signal.

The automatic speech recogniser 72 receives the electrical signal, representative of the spoken word, over a transmission channel having a bandwidth of approximately 4 kHz.

The system may further comprise a signal processor operable to process the electrical signal to a frequency range of 300 Hz to 3400 Hz.

The signal processor filters the electrical signal in order to remove the higher frequency components of the signal which could otherwise be detrimentally and disruptive to the emotion processor making it unstable and causing a less accurate emotion score.

The signal processor also filters the electrical signal to remove the lower frequency components which could otherwise cause the grammar processor 12 to output inaccurate lists of sentences, words and proper nouns, as the grammar processor's sampling rate would exceed the lower frequencies and thereby disrupt the grammar processor's ability to accurately determine the discrete sentences, words and proper nouns and, for example, the ability to distinguish between singular and plural in the unstructured stream of text.

The method of indexing is described below:

FIGS. 2 and 3 respectively illustrate a transcript index and an enhanced transcript index to which a method according to the present invention has been applied.

In particular, in FIG. 2, there is illustrated a transcript comprising a series of phrases (phrase #n used in place of text for illustration). However, phrase#105 is shown as text 'the princess kissed the frog'.

In the machine transcript, the phrase 'the princess kissed the frog' is tagged with timestamps showing the beginning and end of the sentence as follows:

<00:15:01:00>the princess kissed the frog<00:15:05:00>

This would indicate that the sample is 4 seconds long and starts 15 minutes and 1 second into the audio file. If the word 'frog' is an important word in its own right, it could be individually time stamped in accordance with the following.

Example 1

Interpolation based on the number of words. There are 5 words in the sample which approximates to 0.8 s per word. Furthermore, based on this approximation and the word 'frog' being the $5^{th}$ word, it can be estimated that the word 'frog' commences at 3.2 s of the 4 second sample. Thus, an index entry could be created for the word 'frog' as 'frog<00: 15:04:20>'.

Example 2

Interpolation based on the number of letters. There are 24 letters in the sample (excluding spaces) which approximates to 0.17 s per letter. Furthermore, based on this approximation and the word 'frog' being the $21^{st}$ letter, it can be estimated that the term 'frog' commences at 3.33 s of the 4 second sample. Thus, an index entry could be created for the word 'frog' as 'frog<00:15:04:33>'. In a slight variation, one could treat a space as a letter or a number of letters to account for the possibility of pauses between words.

Example 3

Interpolation based on the number of syllables. There are 6 syllables in the sample which approximates to 0.66 s per syllable. Furthermore, based on this approximation and the word 'frog' being the $6^{th}$ syllable, it can be estimated that the term 'frog' commences at 3.33 s of the 4 second sample. Thus, an index entry could be created for the word 'frog' as 'frog<00:15:04:33>'

The above principles can also be applied to component phrases, for example, for the phrase 'kissed the frog' in the same sample as above.

Example 4

Interpolation based on the number of words. As with example 1, there are 5 words in the sample which approximates to 0.8 s per word. Furthermore, based on this approximation and the phrase 'kissed the frog' starting at the $3^{rd}$ word, it can be estimated that the phrase 'kissed the frog' commences at 1.6 s in the 4 second sample. Thus, an index entry could be created for the and the phrase 'kissed the frog' as 'kissed the frog<00:15:02:60>'

Example 5

Interpolation based on the number of letters. As with example 2, there are 24 letters in the sample (excluding spaces) which approximates to 0.17 s per letter. Furthermore, based on this approximation and the phrase 'kissed the frog' starting at the $12^{st}$ letter, it can be estimated that the phrase 'kissed the frog' commences at 1.83 s in the 4 second sample. Thus, an index entry could be created for the and the phrase 'kissed the frog' as 'kissed the frog<00:15:02:83>'

Example 6

Interpolation based on the number of syllables. As with example 2, there are 6 syllables in the sample which approximates to 0.66 s per syllable. Furthermore, based on this approximation and the phrase 'kissed the frog' starting at the $4^{th}$ syllable, it can be estimated that the phrase 'kissed the frog' commences at 2 s in the 4 second sample. Thus, an index entry could be created for the and the phrase 'kissed the frog' as 'kissed the frog<00:15:03:00>'

It can be seen that the above three different methodologies yield different and it may be preferable to use a weighted average of the results.

In FIG. 3, there is illustrated the transcript of FIG. 2, supplemented with additional index entries (in this case the ones from example 1 and example 4).

Note, whilst the phrase 'the princess kissed the frog' is a very short and simple phrase used for illustration purposes, it will be appreciated that a lengthy transcript with infrequent time stamps will greatly benefit from the creation of supplemental index entries for component words and phrases.

Figure 4:
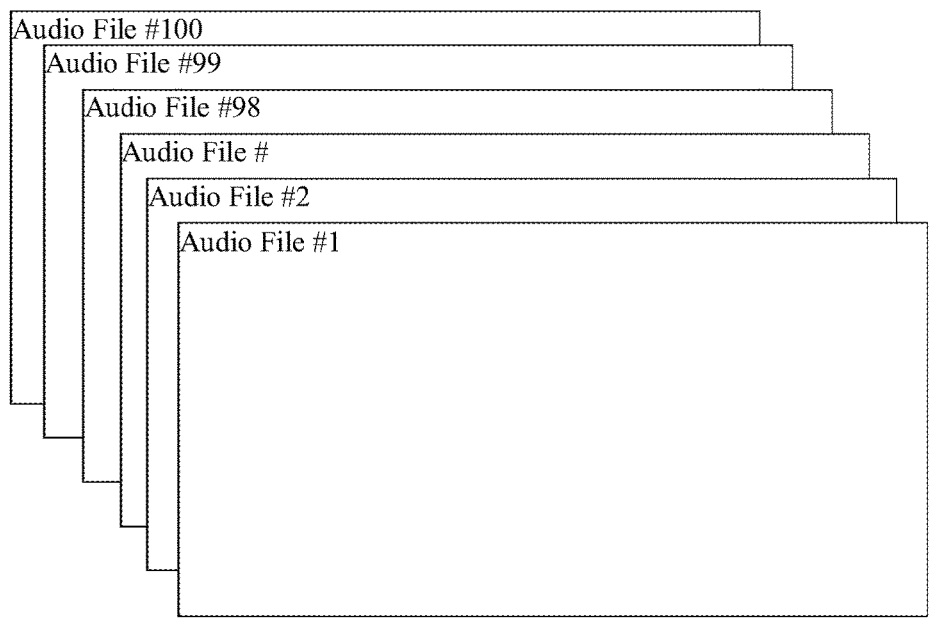
FIGS. 4, 5 and 6 illustrate a series of 100 audio files and corresponding transcript files of the same.
Figure 5:
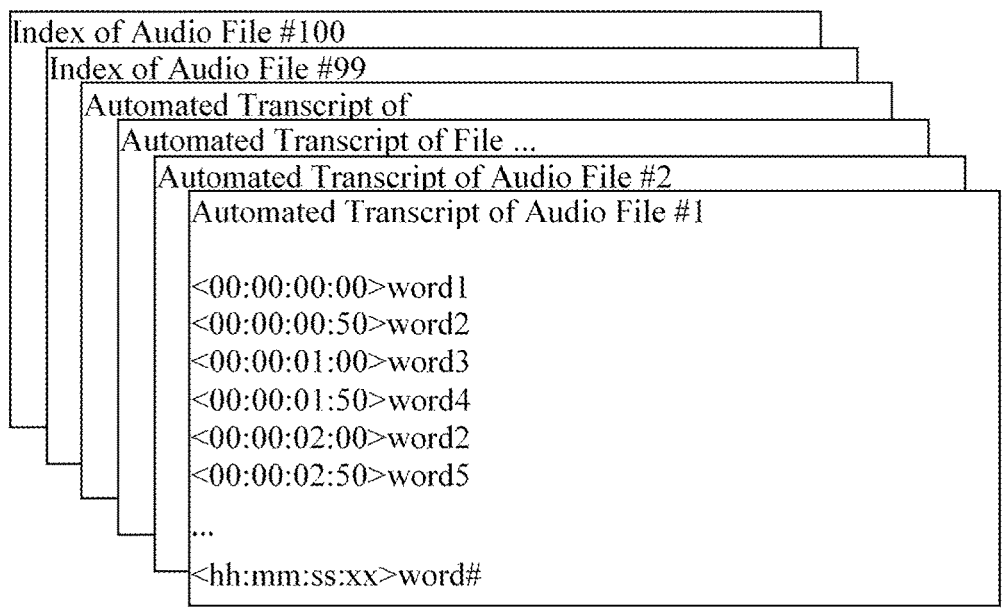
Figure 6:
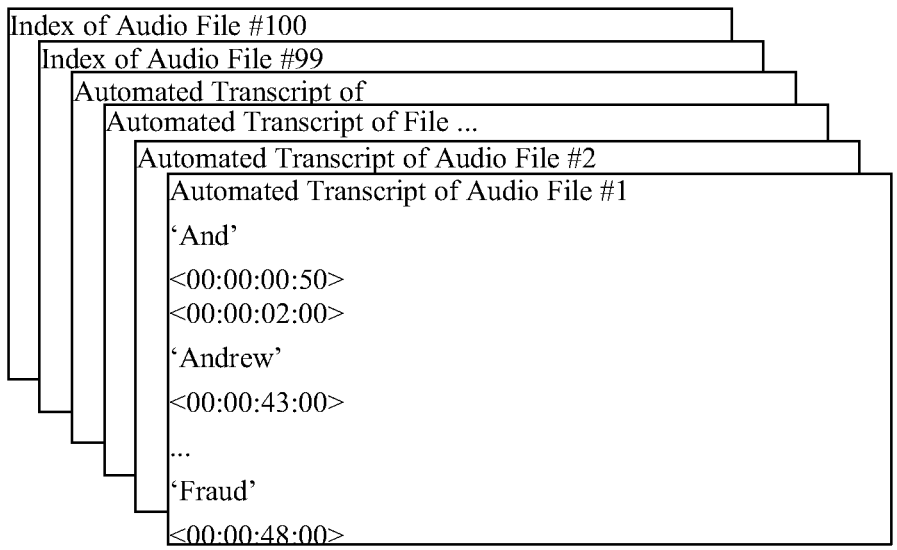

Referring to FIGS. 4, 5 and 6, there is illustrated a series of 100 audio files and corresponding transcript files of the same. Automatic transcription is of course well known.

In FIG. 5, there is illustrated the contents of the transcript file corresponding to audio file#1 comprising a chronological index of a series of words in the format <hh:mm:ss:xx>word# wherein <hh:mm:ss:xx> indicating the time from the start in the audio file the word is spoken by hour, minute, second and hundredth and 'word#' is the word spoken. Further by way of illustration, 'word2' is shown twice in that it is the $2^{nd}$ and $5^{th}$ word spoken in the audio file.

In FIG. 6, there is illustrated the contents of the transcript file illustrated in FIG. 5 sorted in alphabetical order. For example, 'And' is word2; and the word 'Fraud' is word12, first spoken 8 seconds in to the audio file.

Suppose one has 100 audio files, each a recording of a telephone call between Joe Smith and Andrew Jones over a given period of time, each analysed and a machine transcript created as illustrated above.

Figure 7:
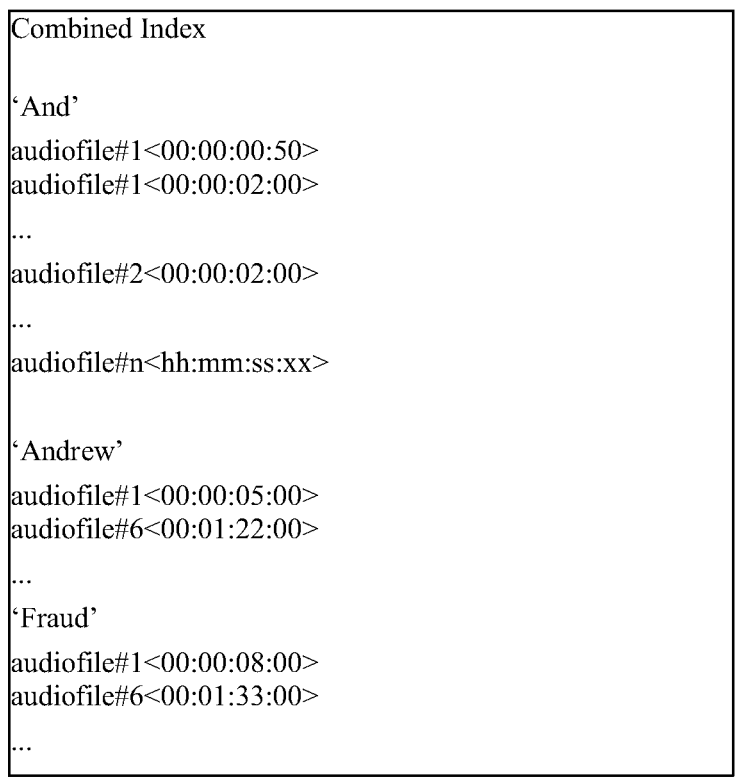

In one embodiment of the present invention, a combined index is created as illustrated in FIG. 7 wherein the word 'And' appears in audiofile#1 at audiofile#1<00:00:00:50>, <00:00:02:00> etc., in audiofile#2 at <00:00:02:00> etc. and in audiofile#n at <hh:mm:ss:xx>. The word 'Andrew' appears in audiofile#1 at <00:00:05:00> and audiofile#6 at <00:01:22:00> The word 'Fraud' appears in audiofile#1 at <00:00:08:00> and in audiofile#6 at <00:01:33:00>.

In another embodiment, an enhanced combined index is created as illustrated in FIG. 8 wherein certain index entries are differentiated based on non-alphabetical and non-chronological criteria. In this case, the word 'Andrew' appears in audiofile#1 at <00:00:05:00> and the word 'Fraud' appears in audiofile#1 at <00:00:08:00> appear highlighted, reflecting the fact that the words spoken were stressed. One might alternatively provide an enhanced combined index ordered in respect of stressed words such as that shown in FIG. 9.

In another embodiment, an enhanced combined index is created based on the most populous words appearing across all the audio files of interest. For example, as shown in FIG. 10, the index is ranking in accordance with the most populous words of those preselected to be of interest illustrated in FIG. 11. Such a list might include business names, persons names or key words directed to a particular topic of interest; in the example provided, for wrong doing in financial services.

Whilst the examples described above are based on individual words, the same could equally apply to phrases or a combination of words and phrased.

Similarly, the indexing may be ordered in relation to a plurality of predetermined, weighted criteria. For example, a weighted index may be provided in an order of popularity where in an instance accented counts ×5 (or is proportional to the degree of accentuation or other sentiment expressed), an instanced on a list of interest counts ×5 and both counts ×20. Further weighted indexes may be provided where rarity is ranked, phrase length, importance (e.g. the phrase "end of the world" might be weighted very highly when the audio files are from a financial trading floor and the purpose is to detect potential fraud and wrongdoing) and indeed many other factors are assessed.

Ideally, the index links directly to the corresponding audio to facilitate manual review of the spoken words and, in particular, to listen to it in context. Also, one might as an alternative from that shown above present the index as a tag cloud wherein the highlighting of the most relevant or important terms is by tag size.

In the examples provided above, complete transcript and complete timing information is available. However, the invention is equally applicable to those portions of a partial transcript and/or where the timing information is incomplete and/or approximate (e.g. where a word if identified by the approximate time of the start or end of the sentence in which it appears).

The indexing apparatus is designed to extract the key words and phrases from the transcription and assign them a score based on pre-determined factors such as word frequency, phrase length and phrase type.

A pointer to the original audio or video file, the key phrase, the score are stored in the database. It is also possible to store timecodes in the database with the key phrase, or separately embedded in the original transcript.

A further aspect of the invention allows for retrieval of key phrase or words relating to an audio or video file based upon different criteria. These criteria can be limited to one audio or video file, or can be aggregated across other audio or video files to allow for weighting based upon multiple, potentially related filed. These criteria can be based, inter alia, upon the scores of key words and phrases, the length of the key words and phrases or the number of occurrences of the key words and phrases, either in an individual audio or video file, or across multiple files.

It will be appreciated that a combined and/enhanced index along the lines discussed can be produced on the fly from a master database by the generation of a custom query (or equivalent depending on the technology used). For example, an operator may chose audio files pertaining to calls between person A and person B, during a particular period C of interest and in which there is mention of key words D, E and F; all prioritised in terms of whatever criteria is desired.

Other embodiments falling within the scope of the appended claims will suggest themselves to those skilled in the art.

The invention claimed is:

1. A system for contextualising an unstructured stream of text representative of spoken word, the system comprising:
 a grammar processor operable to receive the unstructured stream of text representative of the spoken word as an indexed and time-recorded unstructured stream of text, and identify and extract sentences, words and proper nouns from the unstructured stream of text and output a sentence list, a words list and a proper nouns list;
 a sentence processor comprising a natural language processor, a real phrase database and a phrase comparator, wherein the natural language processor is operable to receive the sentence list from the grammar processor and segment each sentence into possible phrases, and wherein the phrase comparator is operable to receive the possible phrases and compare each possible phrase with a plurality of real phrases stored in the real phrase database to provide a matched phrase list derived from the possible phrases;
 a frequency processor operable to receive a word list, a proper noun list and a matched phrase list and determine the number of occurrences of each word, proper noun and matched phrase in the unstructured stream of text, in a system word and phrase corpus and in a real world word and phrase database and for each word, proper noun and matched phrase, to provide a text frequency total, a system corpus total and a real world total;
 a summer operable to sum the text frequency total, the system corpus total and the real world total for each word, proper noun and matched real phrase and output the sum as an audio file total for each word, proper noun and matched real phrase, wherein the audio file total for each word, proper noun and matched real phrase is indexed and accorded at least one of a date of occurrence, a start time, a finish time, and a duration;
 an emotion processor operable to receive the sentence list and evaluate sentiment of the spoken word and provide a sentiment score, wherein sentiment is evaluated at least in part by using times of the unstructured stream of text to determine a time-based rate or duration of letters, syllables or words in at least one phrase in the sentence list; and
 a data significance processor operable to receive the audio file total for each word, proper noun and matched real phrase and output a list comprising the words, proper nouns and matched real phrases in order of contextual significance.

2. A system as claimed in claim 1, wherein the lower the audio file total of the word, proper noun or matched real phrase, the more contextually significant it is determined to be relative to the other words, proper nouns and matched real phrases of the unstructured stream of text representing the spoken word.

3. A system as claimed in claim 1, wherein the lower the system corpus number the more contextually significant the word, proper noun or matched real phrase is determined to be relative to the other words, proper nouns and matched real phrases of the unstructured stream of text representing the spoken word.

4. A system as claimed in claim 1, further comprising an automatic speech recogniser operable to receive audio information signals representing the spoken word and convert the audio information signals into the unstructured stream of text for input into the grammar processor, wherein the automatic speech recogniser is operable to index and time-record each word of the unstructured stream of text and/or each syllable of the unstructured stream of text.

5. A system as claimed in claim 1, wherein a weighting is applicable to at least one of the system corpus total and the matched phrase total.

6. A system as claimed in claim 5, wherein the weighting is an industry weighting, dependent on the industry in which the system is being used.

7. A system as claimed in claim 1, wherein a weighting is applicable to the sentiment score.

8. A system as claimed in claim 7, wherein the weighting is a sentiment industry weighting, dependent on the industry in which the system is being used.

9. A system as claimed in claim 1, wherein the data significance processor is operable to determine the contextual significance between selected or predetermined dates.

10. A system as claimed in claim 1, wherein the unstructured stream of text is representative of the spoken word of a telephone conversation.

11. A system as claimed in claim 10, wherein the unstructured stream of text is received as a real-time data stream.

12. A system as claimed in claim 10, further comprising an acoustic-to-electric transducer operable to sense spoken word in the frequency range of 300 Hz to 3400 Hz and convert the sensed spoken word into an electrical signal.

13. A method for contextualising an unstructured stream of text representative of spoken word, the method comprising:
providing a grammar processor;
 inputting the unstructured stream of text representative of the spoken word as an indexed and time-recorded unstructured stream text into the grammar processor and identifying and extracting sentences, words and proper nouns from the unstructured stream of text and outputting a sentence list, a words list and a proper nouns list;
providing a sentence processor comprising a natural language processor, a real phrase database and a phrase comparator;
 inputting the sentence list into the natural language processor and segmenting each sentence into possible phrases;
 inputting the possible phrases into a comparator and comparing each possible phrase with a plurality of real phrases stored in the real phrase database and outputting a matched phrase list derived from the possible phrases;
providing a frequency processor;
 inputting the word list, proper noun list and matched phrase list into the frequency processor;
 determining the number of occurrences of each word, proper noun and matched phrase in the unstructured stream of text, in a system word and phrase corpus and in a real world word and phrase database; and
 outputting a text frequency total, a system corpus total and a real world total for each word, proper noun and matched phrase;
providing a summer;
 inputting and summing the text frequency total, the system corpus total and real world total for each word, proper noun and matched real phrase; and
 outputting each sum as an audio file total for each word, proper noun and matched real phrase, wherein the audio file total for each word, proper noun and matched real phrase is indexed and accorded at least one of a date of occurrence, a start time, a finish time, and a duration;
providing an emotion processor;
 inputting the sentence list into the emotion processor and evaluating sentiment of the spoken word, wherein sentiment is evaluated at least in part by using times of the unstructured stream of text to determine a time-based rate or duration of letters, syllables or words in at least one phrase in the sentence list; and
 outputting a sentiment score derived from evaluating sentiment of the spoken word; and
providing a data significance processor;
 inputting the audio file total for each word, proper noun and matched real phrase into the data significance processor; and
 outputting a list comprising the word, proper nouns and matched real phrases in order of contextual significance.

14. A method as claimed in claim 13, whereby the lower the audio file total of the word, proper noun or matched real phrase, the more contextually significant it is determined to be relative to the other words, proper nouns and matched real phrases of the unstructured stream of text representing the spoken word.

15. A method as claimed in claim 13, whereby the lower the system corpus number the more contextually significant the word, proper noun or matched real phrase is determined to be relative to the other words, proper nouns and matched real phrases of the unstructured stream of text representing the spoken word.

16. A method as claimed in claim 13, further comprising providing an automatic speech recogniser, inputting audio information signals representing the spoken word into the automatic speech recogniser and converting the audio information signals into the unstructured stream of text for input into the grammar processor.

17. A method as claimed in claim 16, whereby the automatic speech recogniser indexes and time-records each word of the unstructured stream of text and/or each syllable of the unstructured stream of text.

18. A method as claimed in claim 13, whereby a weighting is applied to at least one of the system corpus total and the matched phrase total.

19. A method as claimed in claim 13, whereby a weighting is applied to the sentiment score.

20. A method as claimed in claim 13, whereby the data significance processor determines the contextual significance between selected or predetermined dates.

21. A method as claimed in claim 13, whereby the unstructured stream of text is representative of the spoken word of a telephone conversation and/or wherein the unstructured stream of text is received as a real-time data stream.

22. A computer program product comprising a non-transitory computer readable medium having a computer readable program stored thereon, wherein the computer readable program when executed on a computer causes the computer to carry out a method that comprises:
providing a grammar processor;
 inputting an indexed and time-recorded unstructured stream text representative of spoken word into the grammar processor and identifying and extracting sentences, words and proper nouns from the unstructured stream of text and outputting a sentence list, a words list and a proper nouns list;
providing a sentence processor comprising a natural language processor, a real phrase database and a phrase comparator;
 inputting the sentence list into the natural language processor and segmenting each sentence into possible phrases;
 inputting the possible phrases into a comparator and comparing each possible phrase with a plurality of real phrases stored in the real phrase database and outputting a matched phrase list derived from the possible phrases;
providing a frequency processor;
 inputting the word list, proper noun list and matched phrase list into the frequency processor;
 determining the number of occurrences of each word, proper noun and matched phrase in the unstructured stream of text, in a system word and phrase corpus and in a real world word and phrase database; and outputting a text frequency total, a system corpus total and a real world total for each word, proper noun and matched phrase;

providing a summer;

inputting and summing the text frequency total, the system corpus total and real world total for each word, proper noun and matched real phrase; and outputting each sum as an audio file total for each word, proper noun and matched real phrase, wherein the audio file total for each word, proper noun and matched real phrase is indexed and accorded at least one of a date of occurrence, a start time, a finish time, and a duration;

providing an emotion processor;

inputting the sentence list into the emotion processor and evaluating sentiment of the spoken word, wherein sentiment is evaluated at least in part by using times of the unstructured stream of text to determine a time-based rate or duration of letters, syllables or words in at least one phrase in the sentence list; and outputting a sentiment score derived from evaluating sentiment of the spoken word; and providing a data significance processor;

inputting the audio file total for each word, proper noun and matched real phrase into the data significance processor; and outputting a list comprising the words, proper nouns and matched real phrases in order of contextual significance.

23. A system as claimed in claim 1, wherein sentiment is evaluated using at least one of accentuation of words and phrases, word and phrase pattern, positive-negative word and phrase recognition, rate of words over time, rate of phrases over time and rate of syllables over time.

\* \* \* \* \*